W. H. HETZEL.
HOSE HOLDER.
APPLICATION FILED JULY 5, 1913.
1,128,248.
Patented Feb. 9, 1915.
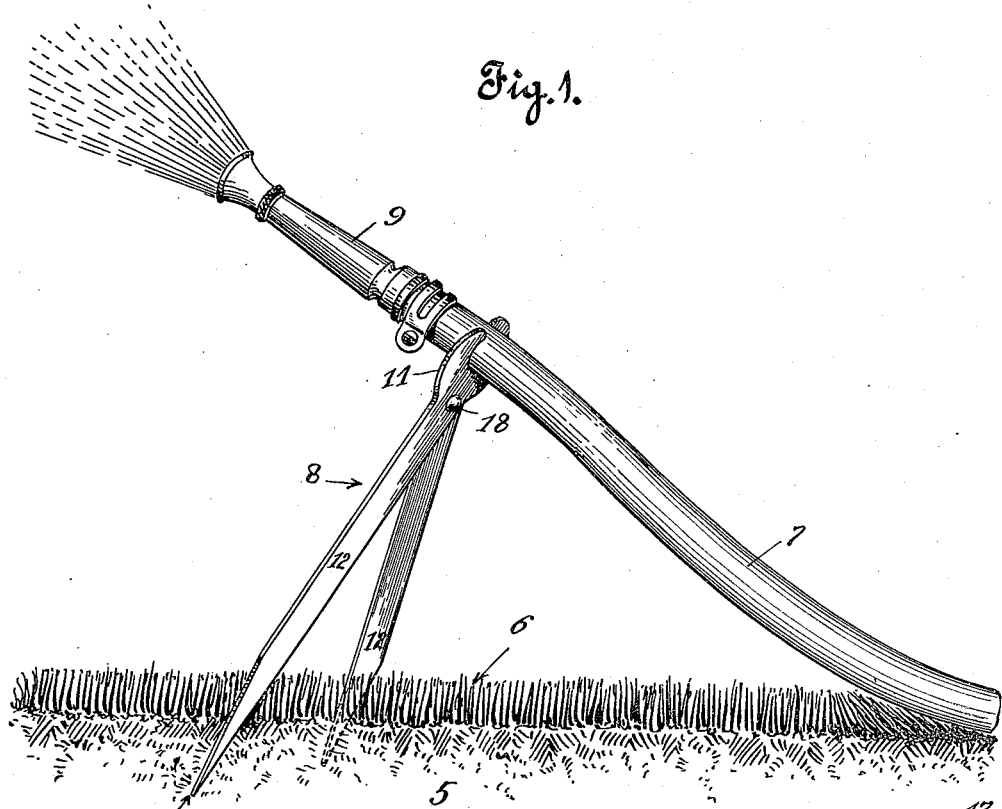
Fig. 1.
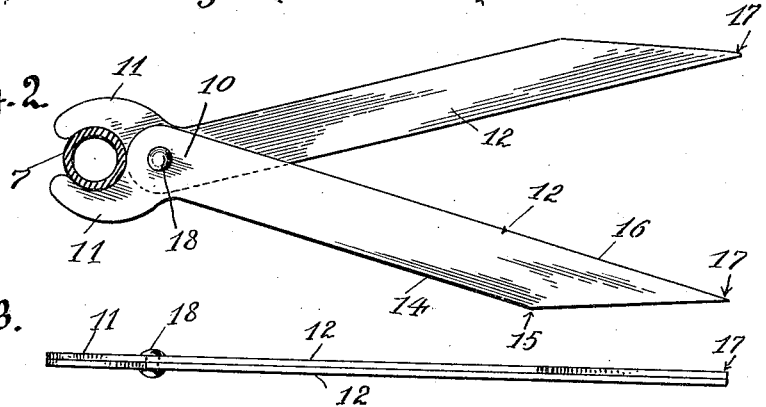
Fig. 2.
Fig. 3.
Witnesses,
Inventor,
by William H. Hetzel,
Attorneys.

UNITED STATES PATENT OFFICE.

WILLIAM H. HETZEL, OF LOS ANGELES, CALIFORNIA.

HOSE-HOLDER.

1,128,248.  Specification of Letters Patent.  Patented Feb. 9, 1915.

Application filed July 5, 1913. Serial No. 777,514.

*To all whom it may concern:*

Be it known that I, WILLIAM H. HETZEL, a citizen of the United States, residing at Los Angeles, in the county of Los Angeles and State of California, have invented new and useful Improvements in Hose-Holders, of which the following is a specification.

This invention relates to hose holders, and the principal object is to provide a hose holder of simple construction that will hold a hose and its nozzle in a multiplicity of positions in relation to a lawn.

It is also an object to provide a hose holder which will grasp a hose and the latter form a convenient handle for forcing the legs into the ground.

It is a further object to provide a hose holder formed out of sheet metal, the component members being of the same configuration, and cut out by a simple form of die.

In the drawings accompanying this specification and forming therewith the application for Letters Patent: Figure 1 shows the application of the device. Fig. 2 is a plan view of the assembled members of device showing the hose in cross section. Fig. 3 is a side edge elevation of the holder.

More specifically in the drawings, 5 designates the surface of the ground upon which is shown grass constituting a lawn 6, the hose 7 being supported in relation to the lawn by means of the holder 8. The holder is shown as grasping the hose posteriorly of the nozzle 9, and although this is not necessary, since the nozzle may be grasped in the arms of the holder, the hose forms a more plastic and resilient medium and adapts itself more readily to the adjustments of which the holder is capable.

The holder 8 is formed of a pair of members of the same configuration, each member consisting mainly of a body portion 10 provided with a centrally located bore from which extend the arms 11 and legs 12, the arms being preferably curved and of the configuration shown with rounded corners, while the legs are preferably straight and of the elongated configuration shown, and having their outer edges 14 cut away from the point 15 on a line which intersects the inner edge 16 forming a point 17. Two of these members are assembled in the position shown with their inner edges facing and bores registering and riveted together by a rivet 18, secured in the bores which forms a pivotal or hinging means for the two members of the holder.

In the operation of the device the legs are brought together the required distance to open the arms sufficiently wide to introduce the hose therein. The legs are then separated until the hose is tightly grasped, and with the hand grasping the hose with the legs embraced by the fingers the points 17 are forced into the ground at the desired angle and such depth that the weight of the hose is readily sustained, the tendency being for the inner edges 16 to be forced apart so that the hose is more tightly grasped, thus obviating the danger of slipping. It will readily be seen that any desired angle may be imparted to the nozzle end, from a vertical position of the legs resulting in a horizontal flow from the nozzle, or to an acute angular relation to the ground which lifts the point of the nozzle to a substantially vertical discharge.

What I claim is:

A garden hose supporter, comprising a pair of complementary plate members arranged to overlap each other and having registering bores therethrough, a pivot pin extending through said bores, a curved arm formed on the upper ends of said plates in continuation thereof and integral therewith, and leg members formed on said plates having impaling points formed thereon and adapted when separated to move the arm extensions into a hose engaging position, whereby the latter will be supported at right angles to the flat faces of the plates when the legs are impaled in the ground.

In witness that I claim the foregoing I have hereunto subscribed my name this 23rd day of June, 1913.

WILLIAM H. HETZEL.

Witnesses:
 MERLE HAMMOND,
 MARIE BATTEY.

Copies of this patent may be obtained for five cents each, by addressing the "Commissioner of Patents, Washington, D. C."